United States Patent
Ferrante et al.

(10) Patent No.: US 7,308,154 B1
(45) Date of Patent: Dec. 11, 2007

(54) METHOD AND APPARATUS FOR ENHANCING A DEGRADED DIGITAL IMAGE

(75) Inventors: Ronald A. Ferrante, Cedar Rapids, IA (US); Timothy W. Rand, Cedar Rapids, IA (US); Mark J. Nimmer, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 624 days.

(21) Appl. No.: 10/689,409

(22) Filed: Oct. 20, 2003

(51) Int. Cl.
*G06K 9/40* (2006.01)
(52) U.S. Cl. ..................... 382/275; 382/254
(58) Field of Classification Search ............... 382/254, 382/275; 358/3.26
See application file for complete search history.

(56) References Cited

U.S. PATENT DOCUMENTS

| | | | | |
|---|---|---|---|---|
| 5,390,264 A | * | 2/1995 | Ishihara et al. | 382/260 |
| 5,526,446 A | * | 6/1996 | Adelson et al. | 382/275 |
| 5,879,284 A | * | 3/1999 | Tsujita | 600/109 |
| 6,108,453 A | * | 8/2000 | Acharya | 382/254 |
| 6,459,818 B1 | * | 10/2002 | George | 382/254 |

* cited by examiner

*Primary Examiner*—Samir Ahmed
*Assistant Examiner*—Randolph Chu
(74) *Attorney, Agent, or Firm*—Nathan O. Jensen; Kyle Eppele

(57) ABSTRACT

A method, apparatus, and computer for enhancing the quality of images that have been subjected to degradation. One example of such degradation occurs as the result of haze in the atmosphere. An enhancement function is derived according to a reference digital image and a degraded version of the reference digital image. The enhancement function is applied to a new digital image to produce an enhanced digital image.

22 Claims, 11 Drawing Sheets

METHOD AND APPARATUS FOR ENHANCING A DEGRADED DIGITAL IMAGE

FIELD OF THE INVENTION

The present invention relates generally to digital imaging and in particular to enhancement of digital images.

BACKGROUND OF THE INVENTION

Safety is a prime concern for the aviation industry. Although flying is very safe from a statistical standpoint, any crash involving even private aircraft receives extensive attention from the Government and from the news media. The crash of a commercial airliner often brings with it the loss of many lives and so attracts even more attention.

Although many aids have been developed that act to improve aircraft safety, the most important safety factor in flying is an attentive pilot who pays careful attention to his surroundings while in the air and on the ground. Chief among the factors that help an attentive pilot to observe his surroundings is good visibility. When clouds or fog obscure visibility, then a pilot's choices are either to avoid flying in the clouds or fog or to rely on navigational instruments under the terms of instrument flight rules (IFR). On many days, however, in many parts of the United States, visibility is impaired, not by clouds or fog, but by smoke, dust, vapor, and moisture that accumulate in the atmosphere. This accumulation is often referred to as haze. Haze is most evident in urban areas having geographical factors that tend to trap haze or smog. However, atmospheric conditions even in rural areas of the central United States lead to haze formation that obscures the horizon during much of the summer. Generally, haze is an element that nearly always must be considered as a factor in evaluating visibility for pilots.

The presence of haze especially impacts the safety of flying in the vicinity of airports. Airports mostly are located near urban areas where haze is already a factor. Of course, air traffic tends to concentrate around airports. Exhaust from aircraft is one of the components of haze. Increasing haze decreases pilot visibility. Decreasing pilot visibility further increases the risk of mid-air collision, a critical safety concern. Aside from the risk of mid-air collision, haze also acts to reduce the ability of a pilot to identify landmarks. Identifying landmarks is an important part of air navigation, especially for pilots flying under visual flight rules (VFR).

It should be clear that anything that can be done to decrease the negative effects of haze would directly increase the safety of flying. This safety improvement would accrue to the benefit of both commercial and general aviation.

The prior art has not effectively addressed methods for decreasing the visual effects of haze. Most effort in this area has been aimed at improving hardware. For example, infrared imaging hardware with enhanced haze penetration capabilities has been developed. However, infrared imagers are quite costly. Infrared imagers also employ reduced picture element (pixel) array sizes that limit achievable resolution. These devices also suffer from associated drawbacks such as fog self-radiation. Ground moisture also can induce a loss of image thermal contrast that reduces the effectiveness of infrared imagers.

SUMMARY OF THE INVENTION

The present invention is directed to a method and apparatus for enhancing the quality of images that have been subjected to degradation. One example of such degradation occurs as the result of haze in the atmosphere.

The present invention comprises a method of enhancing the quality of a new digital image. This method comprises creating an enhancement function and then applying the enhancement function to improve the quality of the new digital image. According to one variation of the method of the present invention, a reference digital image is received. A degraded version of the reference digital image also is received. Deconvolving the reference digital image with the degraded version of the reference digital image forms an enhancement function. When a new digital image is received, the enhancement function is applied to the new digital image to form an enhanced digital image. The enhanced digital image is made available for further interpretation.

According to one alternative variation of the present method, transform techniques are used to deconvolve the reference digital image with the degraded version of the reference digital image. These techniques comprise computing a two-dimensional transform of the reference digital image and computing a two-dimensional transform of the degraded version of the reference digital image. The two-dimensional transform of the reference digital image is divided by the two-dimensional transform of the degraded version of the reference digital image to form a two-dimensional quotient. The deconvolution is completed by computing a two-dimensional inverse transform of the two-dimensional quotient. According to another alternative variation of the method of the present invention, deconvolving the reference digital image with the degraded version of the reference digital image comprises computing a least-squares deconvolution of the reference digital image with the degraded version of the reference digital image.

According to yet another alternative variation of the method of the present invention, a degraded version of a reference digital image is formed by receiving a first degraded version of the reference digital image, receiving a second degraded version of the reference digital image, and combining the first and second degraded versions of the reference digital image to form an average degraded version of the reference digital image.

According to another alternative variation of the present method, receiving a new digital image comprises transferring the new digital image from a digital camera.

One alternative variation of the method of the present invention applies an enhancement function to a new digital image by representing the enhancement function as a digital filter. The new digital image is applied to the input of the digital filter, and the output of the digital filter is computed. According to yet another alternative variation of the present method, the digital filter is a two-dimensional digital filter. According to still one more alternative variation of the present method, computing the output of the digital filter comprises performing a two-dimensional convolution of a two-dimensional input to the digital filter and a two-dimensional unit-sample response of the digital filter.

According to even one more alternative variation of the method of the present invention, applying an enhancement function comprises computing a two-dimensional transform of the new digital image and multiplying the two-dimensional transform of the new digital image by a two-dimensional transform of an enhancement function to form a two-dimensional product. A two-dimensional inverse transform of the two-dimensional product is then computed.

According to still one more alternative variation of the present method, providing an enhancement function comprises receiving a plurality of enhancement functions indexed according to a visual range determination. A visual range determination is received, and an enhancement function is provided according to the visual range determination.

The present invention further comprises an apparatus for enhancing the quality of a new digital image. One embodiment of the apparatus comprises an image receiving unit that receives a digital image. The embodiment further comprises a deconvolution unit that deconvolves a reference digital image with a degraded version of the reference digital image to form an enhancement function. The embodiment still further comprises an enhancement application unit that applies the enhancement function to the new digital image to form an enhanced digital image and a conveyance unit that makes the enhanced digital image available for further interpretation.

According to one alternative embodiment of the image quality enhancing apparatus, the deconvolution unit comprises a two-dimensional transform computing unit capable of computing a two-dimensional transform and a two-dimensional inverse transform and a two-dimensional complex arithmetic unit capable of two-dimensional complex arithmetic unit capable of dividing one two-dimensional transform by another two-dimensional transform.

According to another alternative embodiment, the image quality enhancing apparatus comprises a least-squares deconvolution unit capable of computing a least-squares deconvolution. According to yet another alternative embodiment, the image quality enhancing apparatus further comprises an averaging unit capable of combining a first degraded version of a reference digital image with a second degraded version of the reference digital image to form an average degraded version of the reference digital image. According to another alternative embodiment of the image quality enhancing apparatus, the image receiving unit comprises an interface to a digital camera.

According to still another alternative embodiment of the image quality enhancing apparatus, the enhancement application unit comprises a digital filter unit-sample response coefficient table that represents the enhancement function. The enhancement application unit further comprises a digital filter capable of accepting the new digital image as input. The digital filter in this alternative embodiment is capable of producing an output digital image according to the input and the digital filter unit-sample response coefficient table. According to one other alternative embodiment of the image quality enhancing apparatus, the digital filter unit-sample response coefficient table comprises a two-dimensional unit-sample response coefficient table and the digital filter comprises a two-dimensional digital filter. According to yet one more alternative embodiment, the digital filter comprises a two-dimensional convolution unit capable of performing a two-dimensional convolution of a two-dimensional input and a two-dimensional unit-sample response. Yet another alternative embodiment of the image quality enhancing apparatus comprises a two-dimensional transform computing unit capable of computing a two-dimensional transform and a two-dimensional inverse transform. This alternative embodiment further comprises a two-dimensional complex arithmetic unit capable of calculating a product of two two-dimensional transforms.

The enhancement application unit in still one more alternative embodiment of the image quality enhancing apparatus comprises a plurality of enhancement functions indexed according to a visual range determination. This embodiment further comprises a visual range determination receiver capable of receiving a visual range determination. The enhancement unit provides an enhancement function according to the visual range determination.

The present invention still further comprises an image quality enhancement computer. One embodiment of the image quality enhancement computer comprises memory capable of storing instructions and a processor capable of executing the instruction sequences. This embodiment further comprises image processing instruction sequences stored in the memory. These image processing instruction sequences comprise a deconvolution instruction sequence that, when executed by the processor, minimally causes the processor to deconvolve a first digital image with a second digital image. These image processing instruction sequences further comprise an enhancement instruction sequence that, when executed by the processor, minimally causes the processor to apply an enhancement function to a digital image. This embodiment of the image quality enhancement computer further comprises an image receiver capable of receiving a digital image and of passing the digital image to the processor. This embodiment further comprises a conveyance interface capable of conveying a digital image from the processor.

One alternative embodiment of the image quality enhancement computer further has stored in the memory a two-dimensional transform instruction sequence that, when executed by the processor, minimally causes the processor to perform one of a two-dimensional transform and a two-dimensional inverse transform. The processor in this alternative embodiment comprises an arithmetic unit capable of dividing one two-dimensional transform by another two-dimensional transform. According to another alternative embodiment of the image quality enhancement computer, the deconvolution instruction sequence comprises a least-squares deconvolution instruction sequence that, when executed by the processor, minimally causes the processor to perform a least-squares deconvolution. According to yet another alternative embodiment of the image quality enhancement computer, the nonvolatile memory further has stored therein an average instruction sequence that, when executed by the processor, minimally causes the processor to compute an average of two digital images.

Still another alternative embodiment of the image quality enhancement computer comprises a digital camera interface capable of receiving a digital image transferred from a digital camera.

The memory in yet another alternative embodiment of the image quality enhancement computer has stored therein a digital filter unit-sample response coefficient table that represents the enhancement function. This embodiment further has stored in the memory a digital filter instruction sequence that, when executed by the processor, minimally causes the processor to accept a digital image as input and to produce an output digital image by digitally filtering the input according to the digital filter unit-sample response coefficient table. The digital filter unit-sample response coefficient table in another alternative embodiment of the image quality enhancement computer comprises a two-dimensional unit-sample response coefficient table. The digital filter instruction sequence in this embodiment comprises a two-dimensional digital filter instruction sequence that, when executed by the processor, minimally causes the processor to accept a digital image as input and produce an output digital image by digitally filtering the input according the two-dimensional unit-sample response coefficient table.

According to still another embodiment of the image quality enhancement computer, the digital filter instruction sequence comprises a two-dimensional convolution instruction sequence that, when executed by the processor, minimally causes the processor to perform a two-dimensional convolution of a two-dimensional input and a two-dimensional unit-sample response. According to yet another embodiment of the image quality enhancement computer, the image processing instruction sequences further comprise a two-dimensional transform instruction sequence that, when executed by the processor, minimally causes the processor to perform one of a two-dimensional transform and a two-dimensional inverse transform. The processor in this embodiment comprises an arithmetic unit capable of computing the product of two two-dimensional transforms.

Still one more embodiment of the image quality enhancement computer further comprises a visual range determination receiver capable of receiving a visual range determination. According to this embodiment, the memory has stored therein a plurality of enhancement functions indexed according to the visual range determination. The enhancement instruction sequence, when executed by the processor, minimally causes the processor to apply an enhancement function to a digital image according to the visual range determination.

BRIEF DESCRIPTION OF THE DRAWINGS

The present invention will hereinafter be described in conjunction with the appended drawings and figures, wherein like numerals denote like elements, and in which.

DETAILED DESCRIPTION OF THE INVENTION

Figure 1:
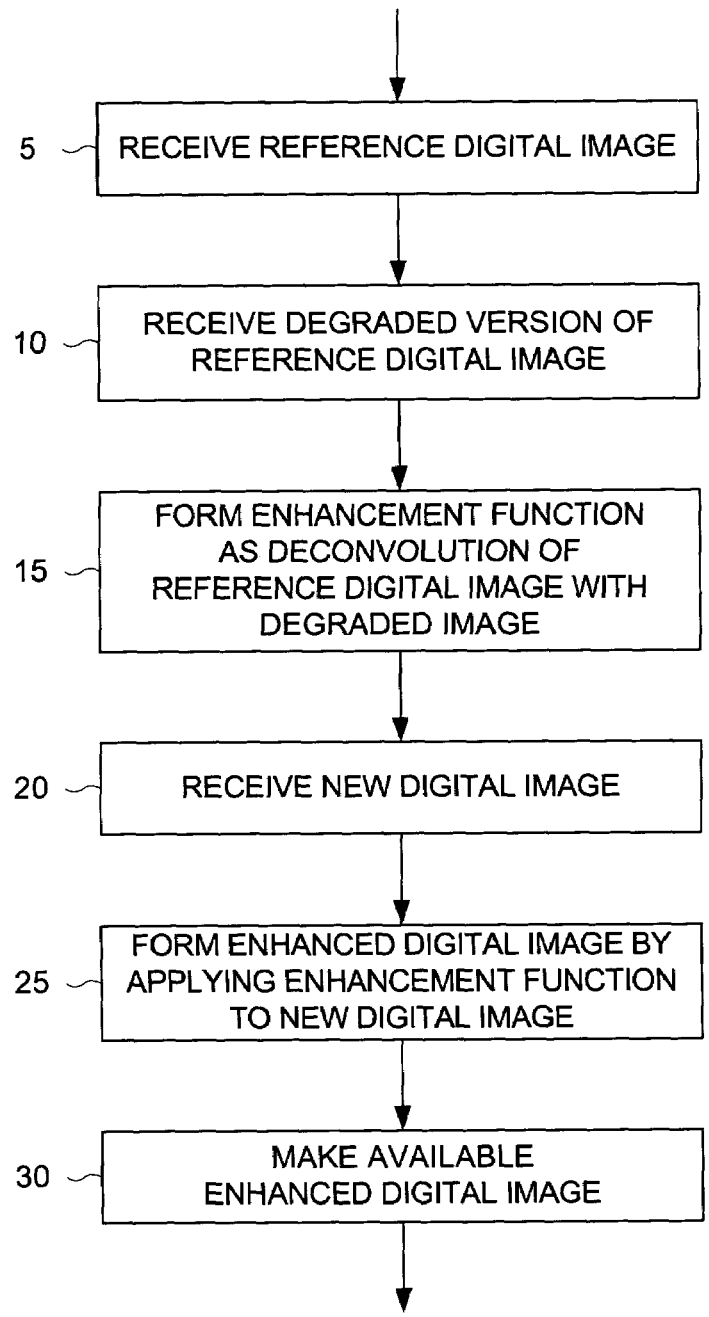
FIG. 1 is a flow diagram of one variation of a method of enhancing the quality of a new digital image.

FIG. 1 is a flow diagram of one variation of a method of enhancing the quality of a new digital image. The method comprises two phases. In a first phase an enhancement function is formed. In a second phase, the enhancement function is employed to enhance a degraded digital image. To form the enhancement function in the first phase, a reference digital image is received (step 5). According to one exemplary variation of the method, a reference digital image comprises an image received from a digital camera. As one example, the image may comprise a digital photograph of an aerial view of a scene in the vicinity of an airport on a clear day.

To continue with the method of forming an enhancement function, a degraded version of the reference digital image also is received (step 10). As in the previous example, the degraded image may comprise a digital photograph of the identical scene comprising an aerial view of the same airport, but on a hazy day. The enhancement function is formed by deconvolving the reference digital image with the degraded version of the reference digital image (step 15).

The method of the present invention operates on mathematical representations of digital images. One form of mathematical representation of a digital image divides the image into regions called picture elements (pixels). In practice, the pixels are small enough to be nearly indistinguishable to the naked eye. According to one method of describing a digital image, each pixel has associated with it an intensity number. According to this method, an intensity of zero might correspond to white while an intensity of 1000 might correspond to black. Intermediate numbers between zero and 1000 might represent shades of gray. Such a method might be employed to represent a gray-scale image. According to another method of describing a digital image, each pixel has associated with it one color such as red, green, blue. Each pixel further may have a number associated with it that represents the intensity of the color associated with that pixel.

Figure 2:
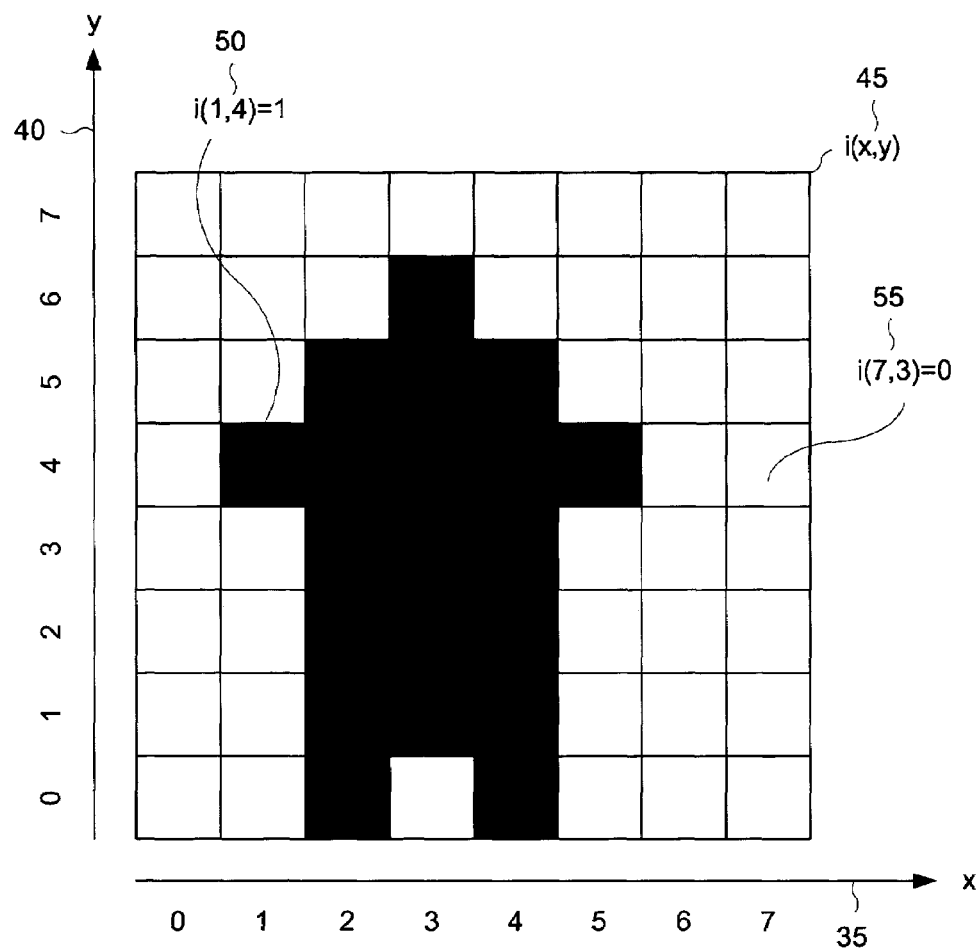
FIG. 2 is a pictorial diagram of an example image described according to the method of the present invention.

FIG. 2 is a pictorial diagram of an example image described according to the method of the present invention. The image in FIG. 2 is a very simple one comprising a total of 64 pixels arranged in an 8×8 grid. Each of the 64 pixels in this simple example can be identified (i.e. addressed) with a pair of integers, (x, y) on an x-axis 35 where x=0, 1, . . . , 7 and on a y-axis 40 where y=0, 1, . . . , 7. Mathematically, the image may be described by a two-dimensional function i(x, y) 45 that represents the intensity of the image at the location (x, y). In this simple example, the intensity of each pixel is either 0 (white) or 1 (black). Thus, e.g., the intensity at the point x=1, y=4 (represented as i(1,4) 50) is 1. Similarly, the intensity at the point x=7, y=3 (represented as i(7,3) 55) is 0. In practice, images often are represented by very large grids comprising millions of points. It is not necessary that the grids be square. The present very simple image is presented only for illustration and is not intended to limit the scope of the present invention.

The deconvolution operation is a mathematical operation that may be difficult to visualize. However, the concept is well understood by those skilled in the art of one- and two-dimensional signal processing. As one intuitive way of visualizing the deconvolution process, it may be helpful to consider an idealized example. This idealized example begins with a "true image" of a scene. The idealized example continues by imagining that the same scene is viewed through a degrading filter. One example of a degrading filter comprises a glass shower door fabricated to blur any scene viewed through the door. An image, as viewed through the degrading filter, is called the degraded image. In this idealized example, both the true image and the degraded image may be observed. A mathematical description of each image also may be constructed. The deconvolution operation comprises combining the mathematical description of the true image with the mathematical description of the degraded image in order to create an idealized mathematical description of a new filter called an inverse filter. The inverse filter acts to undo the blurring effect of the original filter. With the inverse filter in hand, one is able to see the true image by viewing the degraded image through the inverse filter. According to the terminology of the present invention, the inverse filter is referred to as an "enhancement function."

Figure 3:
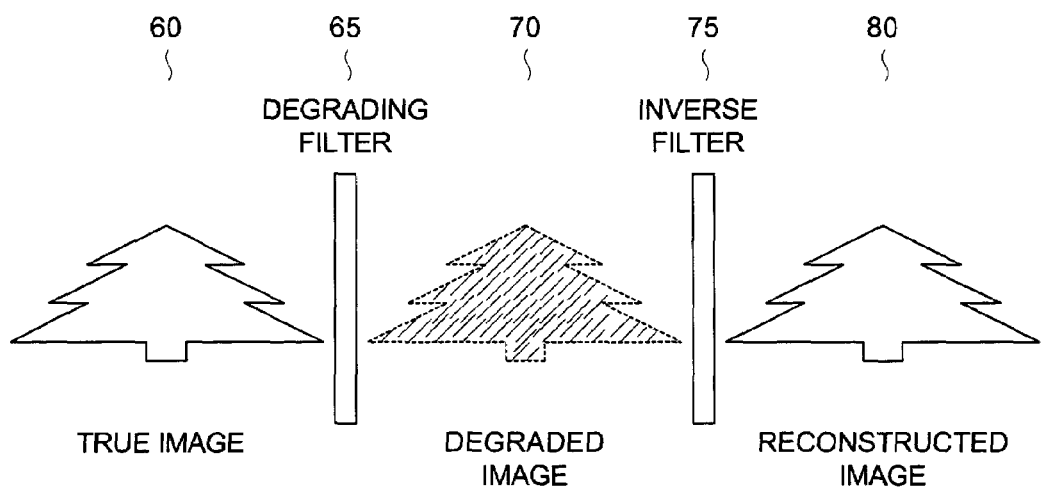
FIG. 3 is a pictorial diagram that illustrates one idealized example of an inverse filtering operation.

FIG. 3 is a pictorial diagram that illustrates one idealized use case of an inverse filtering operation. According to this use case, a true image 60 is filtered through a degrading filter 65 to produce a degraded image 70. The inverse filter 75 forms a reconstructed image 80 that nearly matches the true image 60.

Continuing with the use case in FIG. 3, in order for a perfect inverse filter to be created, the original degrading filter must be "invertible." By invertible is meant that that all of the information in the original scene must be present in the degraded image except that the information elements may be rearranged. One example of a filter that is not invertible is one made of fogged or smoked glass.

The invertibility property is one that may be illustrated with an analogy from elementary algebra. Given the equation 3×y=6, one can multiply both sides of the equation by ⅓, the "inverse" of 3, to learn that y=2. Confirming, it certainly is true that 3×2=6. On the other hand, given the equation 0×y=6, there is no "inverse" of 0. Confirming, there is no number y which, when multiplied by zero yields 6. In this analogy, "3" represents an invertible filter; "0" represents a non-invertible filter.

According to the present invention, the general effect of haze on an image is that of an invertible filter—like a shower door in the previous idealized example. In that regard, haze affects the image of a scene differently from the way that fog or clouds affect an image. Fog or clouds represent a non-invertible filter like smoked or fogged glass. The present invention teaches that haze behaves more like an invertible filter than has previously been understood. In the sequel, the effect of haze will sometimes be described as an "equivalent filter."

Returning to FIG. 1, once the enhancement function has been formed, a new digital image may be received (step 20) in the second phase of this variation of the present method. According to one illustrative example, the new digital image may comprise a degraded digital image. According to another illustrative example, the new digital image is transferred from a digital camera. The new digital image may be enhanced by applying the enhancement function to the new digital image (step 25) to form an enhanced digital image. The enhanced digital image then may be made available (step 30) for further interpretation. According to one illustrative example, the enhanced digital image is presented on a digital display screen where it may be viewed by a user. According to another illustrative example, the user is a pilot who is able to view an enhanced image of an aerial view of the vicinity of an airport.

It should be noted that the reference digital image and the degraded version of the reference digital image must represent images of the same scene. The new digital image, however, may be a degraded version of a different scene. The roles of the reference digital image and the degraded version of the reference digital image are completed once the enhancement function is formed. The enhancement function will be useful in reconstructing any degraded image as long as the degradation in the degraded image can be represented by the same equivalent filter used to derive the enhancement function. In the example of haze, a new digital image viewed through a given level of haze is best enhanced by applying an enhancement function derived from a degraded reference image corresponding to the same level of haze.

Figure 4:
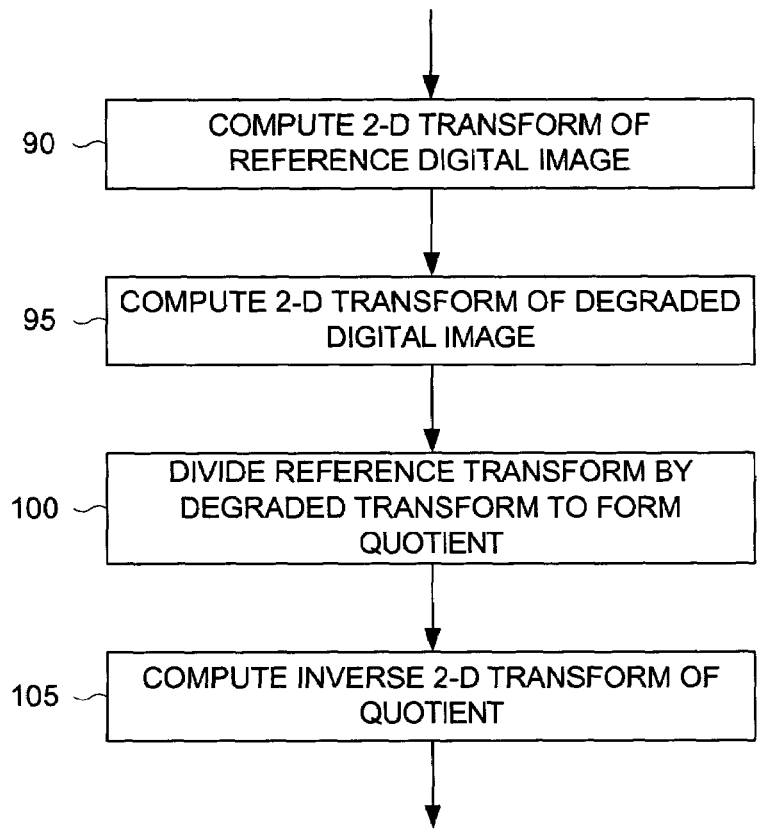
FIG. 4 is a flow diagram of one variation of a method of deconvolving a reference digital image with a degraded version of the reference digital image.

FIG. 4 is a flow diagram of one variation of a method of deconvolving a reference digital image with a degraded version of the reference digital image. According to this variation, a two-dimensional transform of the reference digital image is computed (step 90). The two-dimensional transform may be a Fourier transform. The two-dimensional transform is a mathematical operation formed on the collection of pixels that form the image. A two-dimensional transform of the degraded version of the reference digital image also is computed (step 95). The transform of the reference digital image then is divided by the transform of the degraded version of the reference digital image (step 100) to form a quotient. The quotient represents the transform of an inverse filter. The deconvolution is completed by computing a two-dimensional inverse transform of the quotient (step 105).

A note is in order as to what is meant by "dividing" a two-dimensional transform of one image by the two-dimensional transform of another image. The division operation is conceptually quite simple, being a simple division of the intensity at one point of, for example, a first two-dimensional transform by the intensity at the corresponding point of, for example, a second two-dimensional transform. The division operation is repeated point-by-point for every pair of corresponding points in the two transforms. The quotient is a new transform formed by the collection of point-by-point division operations. The details of the division become more complicated when it is realized that each point in a two-dimensional transform is, in general, a complex number having a real and an imaginary part. Division of transforms, therefore, generally represents point-by-point complex division. The complex division operation is one well understood by those skilled in the art of digital signal processing.

One exemplary method for computing a two-dimensional transform of a digital image is based upon a known transform referred to as a discrete Fourier transform (DFT). According to one illustrative example, consider an image i(x, y) comprising an N×N array of pixels as introduced supra. (Although this example uses a square image for simplicity, an image generally may comprise an $N_1 \times N_2$ array of points where $N_1$ and $N_2$ are not necessarily equal. This choice of a square image in this example is not intended to limit the scope of the invention or of the appended claims.) The DFT of the image is defined as $$I(u, v) = \sum_{y=0}^{N-1} \sum_{x=0}^{N-1} i(x, y) e^{\frac{-j2\pi(xu+yv)}{N}}, u = 0, \quad (1)$$

$$1, \ldots, N-1 \text{ and } v = 0, 1, \ldots, N-1$$

where e=2.71828 . . . is the base of natural logarithms, and $j=\sqrt{-1}$. The function I(u, v) is an N×N array of complex numbers that collectively are referred to as the transform of the image i(x, y).

The inverse DFT has a form very similar to that of the DFT. That is, given an image i(x, y) as just introduced and a transform calculated according to (1), then the original image i(x, y) is recovered by computing $$i(x, y) = \frac{1}{N^2} \sum_{y=0}^{N-1} \sum_{x=0}^{N-1} I(u, v) e^{\frac{j2\pi(xu+yv)}{N}}, x = 0, \quad (2)$$

$$1, \ldots, N = -1 \text{ and } y = 0, 1, \ldots, N - 1.$$

As a convenient way of notating a transform and its inverse, (1) and (2) are often written, respectively, as $$i(x, y) \xrightarrow{DFT} I(u, v) \quad (1')$$

and $$I(u, v) \xrightarrow{IDFT} i(x, y). \quad (2')$$

Use of the DFT is very common in signal processing applications today, chiefly because a family of very efficient algorithms, referred to generically as the fast Fourier transform (FFT) algorithm, is known that makes rapid calculation of the DFT possible. An FFT algorithm often is found in circuit design libraries. The FFT algorithm is widely deployed in integrated circuits used for signal processing applications.

The DFT notation introduced above leads to a concise way of describing the method of performing the deconvolution depicted in FIG. 4: Given a reference digital image, $i_{ref}(x, y)$, and a degraded version of the reference digital image, $i_{deg}(x, y)$, form the transforms $$i_{ref}(x, y) \xrightarrow{DFT} I_{ref}(u, v) \quad (3)$$

and $$i_{deg}(x, y) \xrightarrow{DFT} I_{deg}(u, v). \quad (4)$$

The transform of the enhancement function then is formed by computing the quotient $$EF(u, v) = \frac{I_{ref}(u, v)}{I_{deg}(u, v)}. \quad (5)$$

The enhancement function ef(x, y) is the inverse transform of EF(u, v). That is $$EF(u, v) \xrightarrow{IDFT} ef(x, y). \quad (6)$$

As mentioned supra, the degradation of an image may be described by an equivalent filter. In order to "undo" the effect of the degradation, it is necessary that the equivalent filter that represents degradation be invertible. The invertibility requirement is evident in (5) where a division operation is performed to calculate EF(u, v), the transform of the enhancement function ef(x, y). If values of u and v exist for which $I_{deg}(u, v)=0$, then the division operation represented in (5) will fail at those points. Some method must be employed to avoid attempting to divide by zero. One method that may be used is to replace all zero values of $I_{deg}(u, v)$ with moderately small values.

One alternative method of avoiding division by zero in (5) is to employ least-squares deconvolution. Least-squares deconvolution operates by defining a cost function comprising a squared-error term. A transform, EF(u, v), of the enhancement function, ef(x, y), then is computed such that the cost is minimized. According to one example, a cost function takes the form $$C(u,v)=|I_{ref}(u,v)-EF(u,v)I_{deg}(u,v)|^2+\epsilon|EF(u,v)|^2 \quad (7)$$

where $\epsilon$ is a positive constant that biases (7) away from solutions for which $|EF(u, v)|^2$ is large. The solution that minimizes C(u, v) in (7) is $$EF(u, v) = \frac{I^*_{deg}(u, v) I_{ref}(u, v)}{|I_{deg}(u, v)|^2 + \varepsilon} \quad (8)$$

where $I_{deg}*(u, v)$ denotes the complex conjugate of $I_{deg}(u, v)$. Note that as long as $\epsilon$ is positive, the denominator of (8) can never be zero so that EF(u, v) always exists when (8) is used to calculate its value. Note also that, as $$\varepsilon \to 0, EF(u, v) \to \frac{I_{ref}(u, v)}{I_{deg}(u, v)},$$

the value for EF(u, v) given by (5). In practice, $\epsilon$ should be chosen to have a value that is small relative to the maximum value of $|I_{deg}(u, v)|$. According to one illustrative example, $\epsilon$ is chosen to be about 0.001 times the maximum value of $|I_{deg}(u, v)|$. Computing an IDFT of EF(u, v) yields ef(x, y), a least-squares estimate of an enhancement function.

Figure 5:
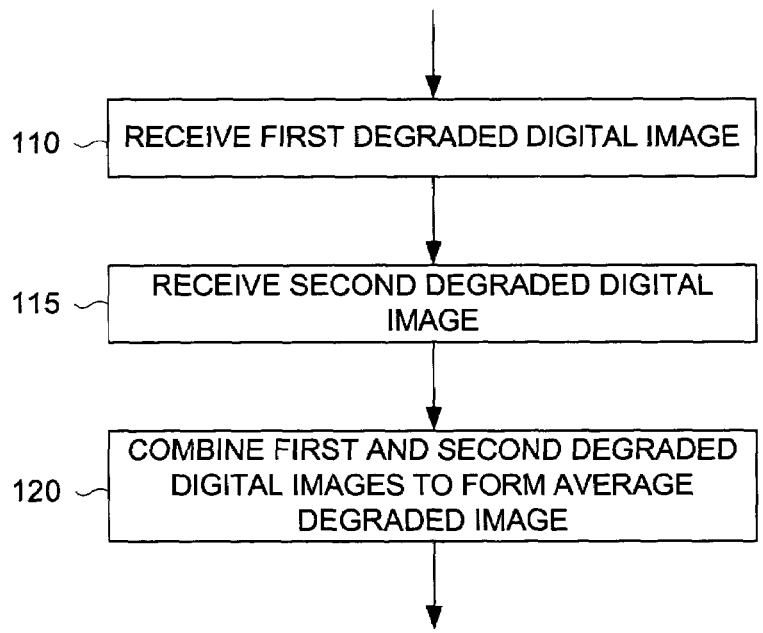
FIG. 5 is a flow diagram of one variation of a method of receiving a degraded version of a reference digital image.

FIG. 5 is a flow diagram of one variation of a method of receiving a degraded version of a reference digital image. According to this variation of the method, a first degraded version of the reference digital image is received (step 110). A second degraded version of the reference digital image also is received (step 115). According to one exemplary use case, the first and second degraded versions of the reference digital image may comprise respective first and second photographs of the same scene taken with a digital camera. The first and second versions of the reference degraded digital image are combined to form an average degraded version of the reference digital image (step 120). According to another variation of the method, any number of degraded versions of the reference digital image may be combined to form an average. Generally, increasing the number of images in the average improves the performance of the enhancement function formed when the resultant degraded version of the reference digital image is used in the method already described. This improvement results from averaging out random effects or "noise" that may be present in the degraded versions of the reference digital image.

Figure 6:
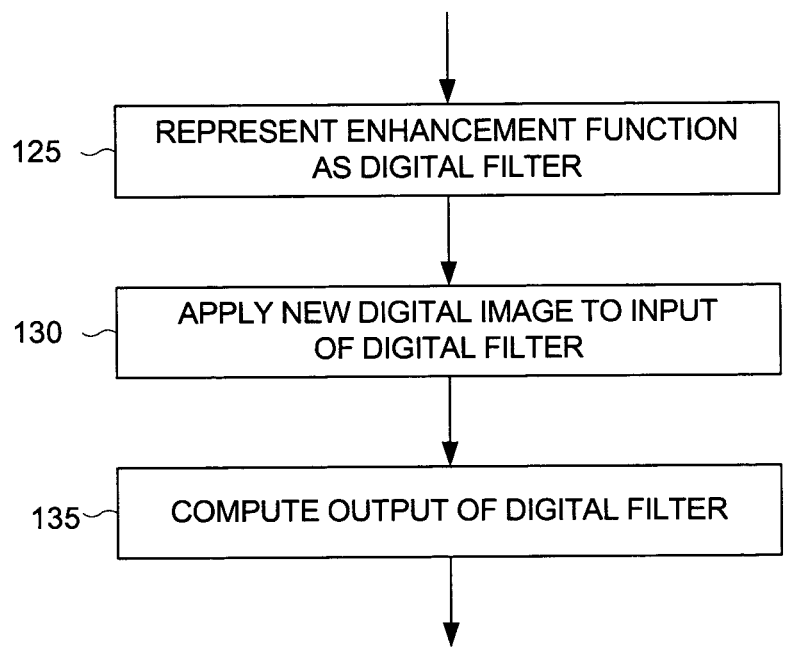
FIG. 6 is a flow diagram of one variation of a method of applying an enhancement function.

FIG. 6 is a flow diagram of one variation of a method of applying an enhancement function. According to this variation, the enhancement function is represented as a digital filter (step 125). A new digital image, $i_{new}(x, y)$, is applied to the input of the digital filter (step 130), and the output of the digital filter is computed (step 135). One implementation of a digital filter comprises a one-dimensional structure. One exemplary embodiment of the invention employs such a filter for images that are presented as a collection of horizontal scan lines. Television images, as one example, assume this form. One way of defining a one-dimensional digital filter is to begin with EF(u, v) and to construct a one-dimensional unit-sample response for the digital filter based upon EF(u, v). Two-dimensional DFTs tend to concentrate their energy in the center of the N×N square in which they are defined. Accordingly, one embodiment of the invention comprises a filter based upon a horizontal line through the center of the EF(u, v) function, i.e., along the line defined by v=N/2. The resulting one-dimensional transform is EF(u,N/2) for u=0, 1, . . . , N−1. The one-dimensional IDFT of EF(u, N/2) is $$ef_1(x) = \frac{1}{N}\sum_{u=0}^{N-1} EF(u, N/2)e^{\frac{j2\pi xu}{N}}, \text{ for } x = 0, 1, \ldots, N-1. \tag{9}$$

One embodiment of a digital filter based upon (9) employs $ef_1(x)$ as a unit-sample response. (The unit-sample response of a digital filter is the output of the filter when a single point, 1, is applied at its input.) Applying a new image, $i_{new}(x, y)$, to the filter input and calculating the filter output creates a reconstructed image, $i_{recon}(x, y)$, as the output of the digital filter. The calculation uses a one-dimensional convolution equation $$i_{recon}(x, y) = \sum_{k=0}^{N-1} ef_1(k)i_{new}(x-k, y), \text{ for } x = 0, 1, \ldots, N-1 \text{ and } y = 0, 1, \ldots, N-1. \tag{10}$$

The example just presented is only one possible choice of a one-dimensional digital filter that can be employed for image enhancement. According to another embodiment of the one-dimensional digital filter, $ef_1(x)$ again begins with EF(u, v). The effect of the v variable then is averaged out to yield $$EF_1(u) = \frac{1}{N}\sum_{v=0}^{N-1} EF(u, v), \text{ for } u = 0, 1, \ldots, N-1. \tag{11}$$

The digital filter unit-sample response, $ef_1(x)$, is computed as $$ef_1(x)\sum_{u=0}^{N-1} EF_1(u)e^{\frac{j2\pi xu}{N}}, \text{ for } x = 0, 1, \ldots, N-1. \tag{12}$$

With the unit-sample response of the filter defined, the filter is employed as in (10) to calculate a reconstructed image, $i_{recon}(x, y)$.

These two examples of methods for calculating a one-dimensional unit-sample response for a digital filter are presented for illustrative purposes only and do not limit the intended scope of the present invention.

According to one alternative variation of a method for applying an enhancement function, a two-dimensional digital filter is used. The digital filter is constructed with a two-dimensional unit-sample response equal to the enhancement function, ef(x, y). A new digital image is applied to the input of the two-dimensional digital filter. The filter output is computed as a two-dimensional convolution of the new digital image and the two-dimensional unit-sample response of the digital filter. One implementation of the two-dimensional convolution equation takes the form $$i_{recon}(x, y) = \sum_{m=0}^{N-1}\sum_{n=0}^{N-1} ef(m, n)i_{new}(x-m, y-n), \tag{11}$$
$$x = 0, 1, \ldots, N-1 \text{ and } y = 0, 1, \ldots, N-1.$$

Figure 7:
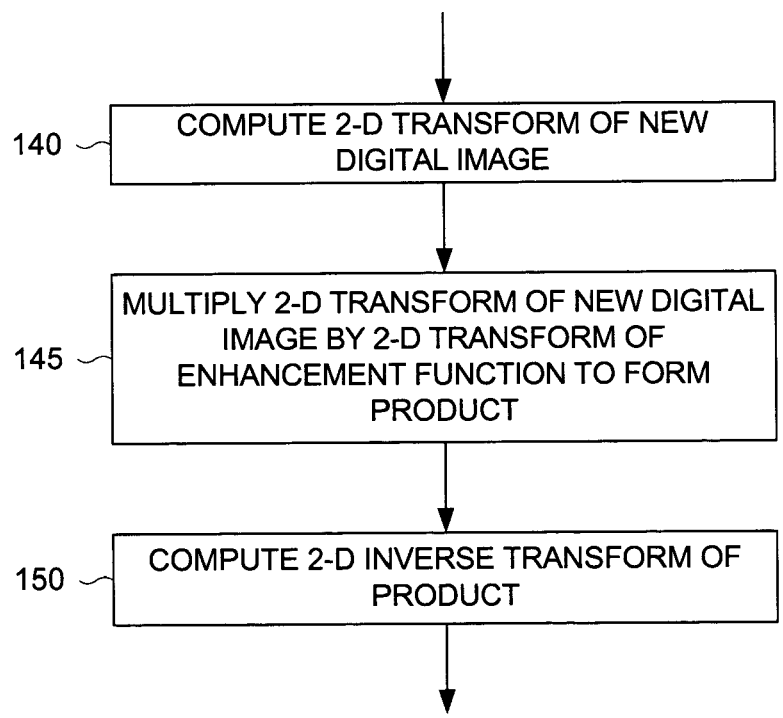
FIG. 7 is a flow diagram of one alternative variation of a method of applying an enhancement function.

FIG. 7 is a flow diagram of one alternative variation of a method of applying an enhancement function. According to this alternative variation, a two-dimensional transform of a new digital image is computed (step 140). The two-dimensional transform of the enhancement function (Cf. (6) and (8) supra) then multiplies the two-dimensional transform of the new digital image (step 145) to form a two-dimensional product. (The multiplication is performed point-by-point as was the case for division as described supra.) The reconstructed image results from computing a two-dimensional inverse transform of the product (step 150). The equations that describe this alternative variation of the method follow readily from the derivations already presented. The transform, EF(u, v), already exists from the phase one calculation of the method. Given a new digital image, $i_{new}(x, y)$, the transform of $i_{new}(x, y)$ is computed as $$i_{new}(x, y) \xrightarrow{DFT} I_{new}(u, v). \tag{12}$$

A product $$I_{recon}(u, v) = EF(u, v)I_{new}(u, v) \tag{13}$$

is formed, representing the transform, $I_{recon}(u, v)$, of the reconstructed image, $i_{recon}(x, y)$. The reconstructed image is computed from $$I_{recon}(u, v) \xrightarrow{IDFT} i_{recon}(x, y). \tag{14}$$

Figure 8:
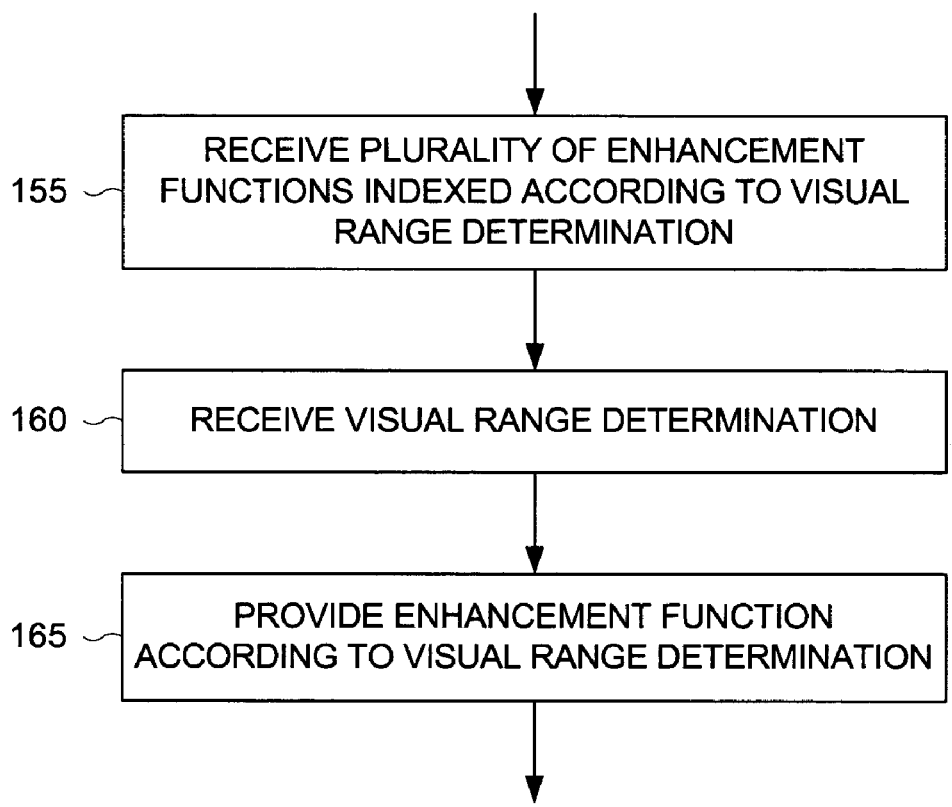
FIG. 8 is a flow diagram of one variation of a method of providing an enhancement function.

FIG. 8 is a flow diagram of one variation of a method of providing an enhancement function. According to this variation, a plurality of enhancement functions is received (step 155). The enhancement functions are indexed according to a visual range determination. According to one exemplary variation of the method, each of the plurality of enhancement functions is formed according to the method of the present invention. According to one example, each of the enhancement functions is formed according to a distinct level of haze. The level of haze is estimated by determining the visual range in effect at the time of taking the digital photograph used to form the enhancement function. In this way, a plurality of enhancement functions is obtained, each one corresponding to a different value for visual range. This variation of the method proceeds by receiving a visual range determination (step 160). According to an other example, a pilot may receive a visual range determination from the air traffic control tower at an airport. Alternatively, experienced pilots may be able to estimate visual range by observing the level of haze in the vicinity of an airport. With a visual range determination made, an enhancement function is selected according to the visual range determination (step 165). In this way, an enhancement function can be nearly optimized for a given level of haze, thus providing a pilot with the best possible compensation for the degrading effects of the haze.

According to yet one more variation of the method of the invention, a pilot may select an arbitrary value for visual range determination, apply an enhancement function to a new digital image and observe an enhanced view that results. The pilot then may adjust the selected value of visual range in order to improve the view of a scene of interest.

Figure 9:
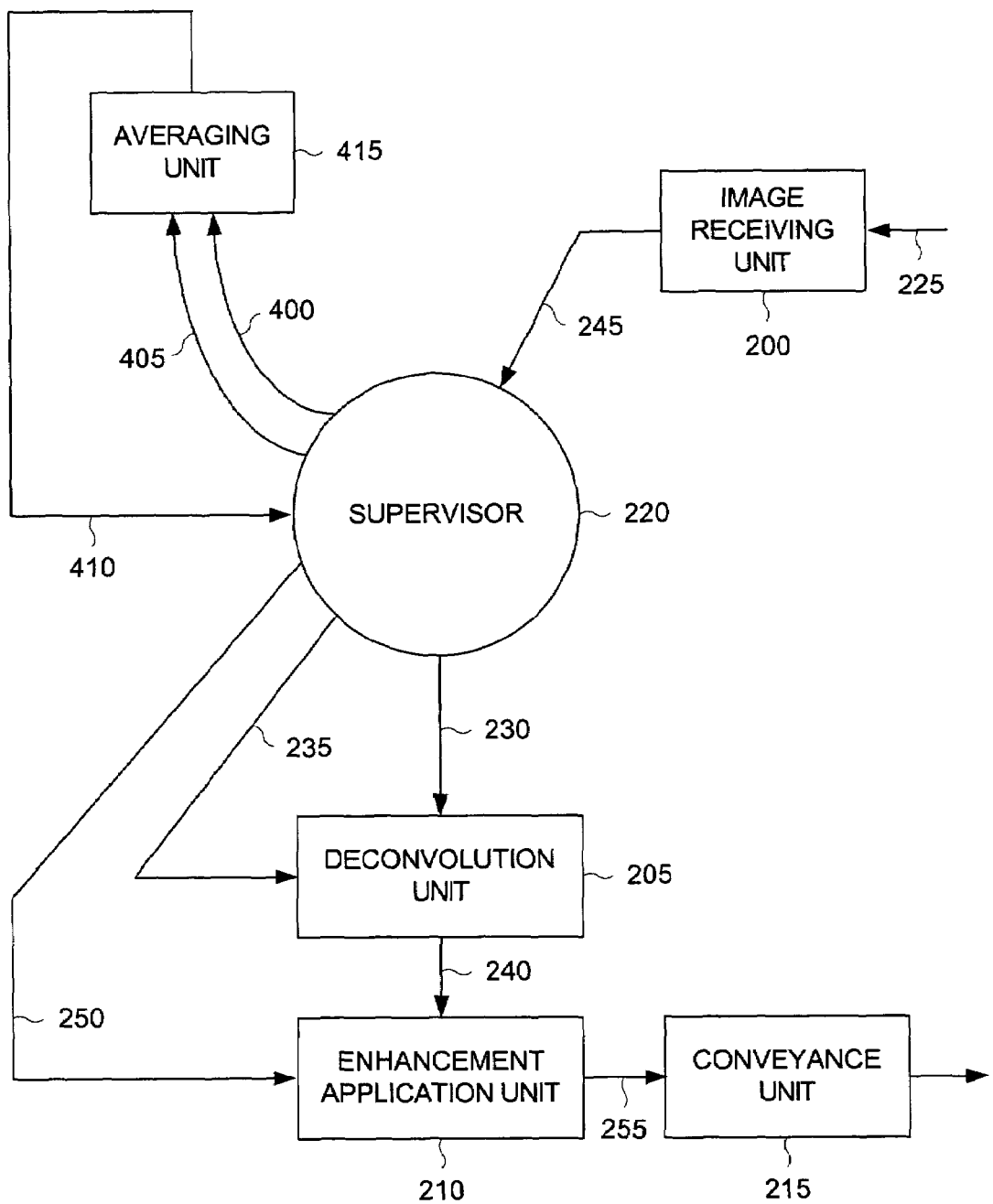
FIG. 9 is a block diagram of one embodiment of an apparatus for enhancing the quality of a digital image.

FIG. 9 is a block diagram of one embodiment of an apparatus for enhancing the quality of a digital image. This embodiment of the apparatus comprises an image receiving unit 200, a deconvolution unit 205, an enhancement application unit 210, and a conveyance unit 215. The apparatus further comprises a supervisor 220 that facilitates the interworking of the previously mentioned components of the apparatus. According to one exemplary mode of operation, the image receiving unit 200 receives a reference digital image on its input 225. The reference digital image is passed to the supervisor 220 over path 245. The supervisor 220 passes the reference digital image to the deconvolution unit 205 over path 230. The deconvolution unit 205 comprises internal memory capable of temporarily storing received images. The image receiving unit 200 further receives a degraded version of the reference digital image on its input 225. The degraded version of the reference digital image likewise is passed to the supervisor 220 over path 245. The supervisor 220 passes the degraded version of the reference digital image to the deconvolution unit 205 over path 235. The deconvolution unit 205 forms an enhancement function by computing a deconvolution of the reference digital image on its 230 input with the degraded version of the reference digital image on its 235 input. The enhancement function is passed to the enhancement application unit 210 over path 240. The enhancement application unit 210 comprises internal memory capable of storing an enhancement function. With an enhancement function in place, the apparatus is able to process a new digital image according to the method of the present invention.

One alternative embodiment of the image quality enhancing apparatus further comprises an averaging unit 415. According to one example mode of operation, the averaging unit receives a first digital image on a first input 400 and a second digital image on a second input 405. The averaging unit 415 computes a point-by-point average of the first and second digital images and places the result on output 410. According to another example mode of operation, the supervisor 220 passes the first and second digital images to the averaging unit 415. The supervisor 220 further receives the result of the computation placed on output 410.

The image receiving unit 200 still further may receive a new digital image on its input 225. According to one exemplary embodiment, the new digital image is a degraded image that may be improved by image enhancement according to the method of the present invention. The received new digital image is passed to the supervisor 220 over path 245. The supervisor 220 passes the new digital image to the enhancement application unit 210 over path 250. The enhancement application unit 210 applies the previously received enhancement function to the new digital image to form a reconstructed image. The reconstructed image is passed to the conveyance unit 215 over path 255. The conveyance unit 215 is capable of conveying the reconstructed image to a destination where the image may be interpreted. According to one exemplary embodiment, the conveyance unit passes the image to a display screen where the image may be viewed by a user. According to one use case, the user is a pilot of an aircraft.

According to one illustrative embodiment of the present invention, the apparatus depicted in FIG. 9 is capable of receiving new digital images and presenting reconstructed images at video rates, approximately 30 times per second.

Figure 10:
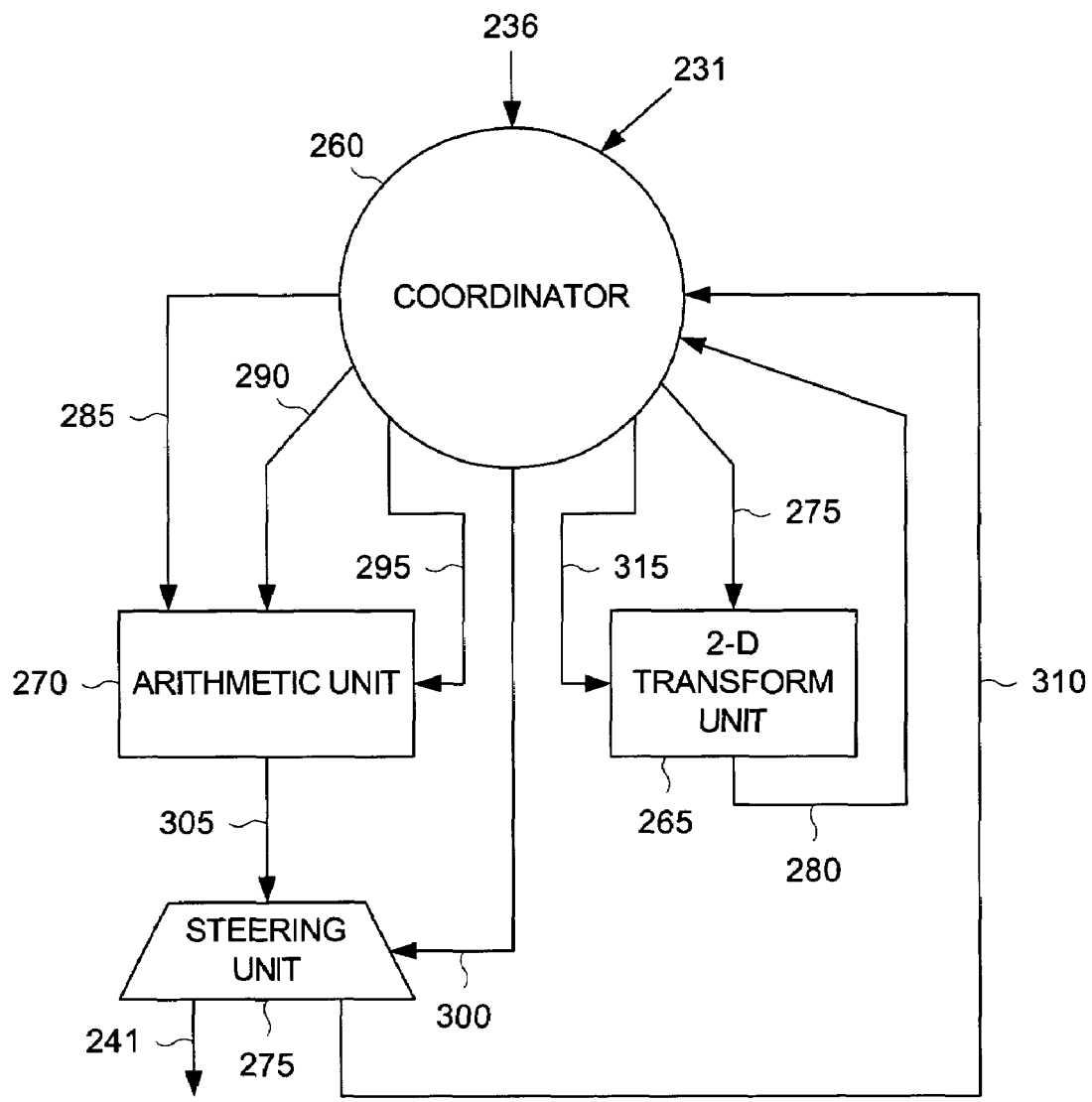
FIG. 10 is a block diagram of one embodiment of a deconvolution unit.

FIG. 10 is a block diagram of one embodiment of a deconvolution unit. One illustrative embodiment of the deconvolution unit comprises a two-dimensional transform unit 265, an arithmetic unit 270, and a steering unit 275. This embodiment of the deconvolution unit further comprises a coordinator 260 capable of facilitating communication among the aforementioned elements. The coordinator 260 further is capable of receiving inputs to the deconvolution unit (231, 236). The coordinator 260 even further comprises internal memory capable of temporarily storing digital images, transforms of digital images, and other parameters.

One exemplary mode of operation of the deconvolution unit 205 follows the method outlined supra according to (3), (4), (5), and (6). The coordinator 260, according to this exemplary mode of operation, receives a reference digital image over path 231. The coordinator 260 passes the reference digital image to the two-dimensional transform unit 265 over path 275. The coordinator 260 sets an INV control 315 to FALSE to command the two-dimensional transform unit 265 to compute a two-dimensional transform. The two-dimensional transform unit 265 computes a two-dimensional transform of the reference digital image and passes the two-dimensional transform of the reference digital image to the coordinator 260 over path 280. The coordinator 260 temporarily stores the transform of the reference digital image. The coordinator further receives a degraded version of the reference digital image over path 236. The coordinator passes the degraded version of the reference digital image to the two-dimensional transform unit 265 over path 275. The coordinator 260 again sets the INV control 315 to FALSE to command the two-dimensional transform unit 265 to compute a two-dimensional transform. The two-dimensional transform unit 265 computes a two-dimensional transform of the degraded version of the reference digital image and passes the two-dimensional transform of the reference digital image to the coordinator 260 over path 280.

The coordinator 260 passes the transform of the reference digital image to the arithmetic unit 270 over path 285. The coordinator 260 further passes the transform of the degraded reference digital image to the arithmetic unit 270 over path 290. The coordinator 260 issues a divide command 295 to the arithmetic unit 270. The divide command 295 causes the arithmetic unit 270 to perform a two-dimensional complex division of the transform of the reference digital image received on input 285 by the transform of the degraded version of the reference digital image received on input 290 to form a two-dimensional quotient. The arithmetic unit 270 computes the quotient as commanded. The arithmetic unit 270 presents the quotient on path 305. The coordinator 260, in this illustrative mode of operation, issues a steering command 300 to the steering unit 275 that causes the quotient on path 305 to be presented on path 310. The quotient thus is received by the coordinator 260.

The two-dimensional quotient comprises the transform, $EF(u, v)$, of the enhancement function according to (5) above. The coordinator 260 passes the quotient to the two-dimensional transform unit 265 over path 275. The coordinator 260 sets the INV control 315 to TRUE to command the two-dimensional transform unit 265 to compute a two-dimensional inverse transform. The two-dimensional transform unit 265 computes the two-dimensional inverse transform as commanded and presents the result to the coordinator on path 280. The two-dimensional inverse transform represents the enhancement function, ef(x, y), according to (6) above. The coordinator 260 passes the enhancement function to the arithmetic unit 270 on path 285. The coordinator 260 further passes a constant, one, to the arithmetic unit 270 on path 290. The coordinator 260 still further issues a multiply command 295 to the arithmetic unit 270. The arithmetic unit 270 multiplies the enhancement function by one (i.e. does not change the enhancement function) and presents the enhancement function on path 305. The coordinator 260 issues a steering command 300 to the steering unit 275 that causes the enhancement function to be presented on path 241.

One alternative embodiment of the deconvolution unit 205 in FIG. 10 implements a deconvolution operation by computing a least-squares form of an enhancement function. The coordinator 260 in this alternative embodiment receives a reference digital image over path 231. One exemplary mode of operation of this alternative embodiment of the deconvolution unit 205 follows the method outlined supra according to (8). According to this exemplary mode of operation, the coordinator 260 first causes the numerator of (8) to be computed. Computing the numerator of (8) commences by passing the reference digital image to the two-dimensional transform unit 265 over path 275. The two-dimensional transform unit 265 computes a two-dimensional transform of the reference digital image and passes the two-dimensional transform of the reference digital image to the coordinator 260 over path 280. The coordinator 260 temporarily stores the transform of the reference digital image. The coordinator further receives a degraded version of the reference digital image over path 236. The coordinator passes the degraded version of the reference digital image to the two-dimensional transform unit 265 over path 275. The two-dimensional transform unit 265 computes a two-dimensional transform of the degraded version of the reference digital image and passes the two-dimensional transform of the reference digital image to the coordinator over path 280. The coordinator 260 stores the two-dimensional transform of the degraded version of the reference digital image. The coordinator 260 passes the two-dimensional transform of the reference digital image to the arithmetic unit 270 over path 285. The coordinator 260 further calculates the complex conjugate of the two-dimensional transform of the degraded digital image and passes the result to the arithmetic unit 270 over path 290. The coordinator 260 issues a multiply command 295 to the arithmetic unit 270. The multiply command 295 causes the arithmetic unit 270 to perform a two-dimensional complex product of the transform of the reference digital image received on input 285 by the complex conjugate of the transform of the degraded version of the reference digital image received on input 290 to form a two-dimensional product. The arithmetic unit 270 computes the product as commanded and places the product on path 305. The coordinator 260 issues a steering command 300 to the steering unit 275 that causes the product to appear on path 310. The product is received by the coordinator 260. The coordinator 260 places the product, which represents $I_{deg}^*(u, v)I_{ref}(u, v)$, the numerator of (8), into temporary storage.

The coordinator 260 then commences to calculate a denominator according to (8). Accordingly, the coordinator 260 passes a copy of the stored two-dimensional transform of the degraded version of the reference digital image to the arithmetic unit 270 over path 285. The coordinator 260 issues a multiply command 295 to the arithmetic unit 270 to cause the arithmetic unit 270 to compute the product of the two-dimensional transform of the degraded version of the reference digital image on its input 285 and the complex conjugate of the two-dimensional transform of the degraded version of the reference digital image on its input 290. The arithmetic unit 270 computes the product as commanded and places the result on the output path 305. The coordinator 260 issues a steering command 300 to the steering unit 275 that causes the product to appear on path 310. The product is received by the coordinator 260. The coordinator 260 stores the product. The product represents the first term, $|I_{deg}(u, v)|^2$ in the denominator of (8).

The coordinator 260 scans the values of the product, notes the maximum value, and computes the positive square root of the maximum value. This square root represents the maximum value of $|I_{deg}(u, v)|$. The coordinator 260 then chooses a positive number, that is small relative to the maximum value of $|I_{deg}(u, v)|$. According to one use case, the value of $\epsilon$ is chosen to be about 0.001 times the maximum value of $|I_{deg}(u, v)|$. The coordinator 260 passes the value of $\epsilon$ to the arithmetic unit 270 over path 285. The coordinator 260 further passes the previously stored value of $|I_{deg}(u, v)|^2$ to the arithmetic unit 270 over path 290. The coordinator 260 issues an add command 295 to the arithmetic unit 270 that commands the arithmetic unit 270 to add the value on its input 285 to the value on its input 290. The arithmetic unit performs the addition as commanded and places the result on output path 305. The coordinator 260 issues a steering command to steering unit 275 that causes the result to appear on path 310. The result is passed to the coordinator 260. The result represents $|I_{deg}(u, v)|^2+\epsilon$, the denominator of (8). The coordinator 260 passes the previously stored value of the numerator of (8), $I_{deg}^*(u, v)I_{ref}(u, v)$, to the arithmetic unit 270 over path 285. The coordinator 260 also passes the stored value of the denominator of (8), $|I_{deg}(u, v)|^2+\epsilon$, to the arithmetic unit 270 over path 290. The coordinator 260 issues a divide command 295 that commands the arithmetic unit 270 to perform a division of $I_{deg}^*(u, v)I_{ref}(u, v)$ on its input 285 by $|I_{deg}(u, v)|^2+\epsilon$ on its input 290. The arithmetic unit 270 performs the division as commanded and places the result on output path 305. The coordinator 260 issues a steering command 300 that causes the result, which represents the transform of the enhancement function, EF(u, v), according to (8), to be placed on path 310. The coordinator 260 receives the result. The coordinator 260 passes the result to the two-dimensional transform unit 265 over path 275. The coordinator 260 sets the INV control 315 to TRUE to command the two-dimensional transform unit 265 to compute a two-dimensional inverse transform. The two-dimensional transform unit 265 computes the two-dimensional inverse transform as commanded and presents the result to the coordinator on path 280. The two-dimensional inverse transform represents the enhancement function, ef(x, y), according to (8) above. The coordinator 260 passes the enhancement function to the arithmetic unit 270 on path 285. The coordinator 260 further passes a constant, one, to the arithmetic unit 270 on path 290. The coordinator 260 still further issues a multiply command 295 to the arithmetic unit 270. The arithmetic unit 270 multiplies the enhancement function by one and presents the enhancement function on path 305. The coordinator 260 issues a steering command 300 to the steering unit 275 that causes the enhancement function to be presented on path 241.

Figure 11:
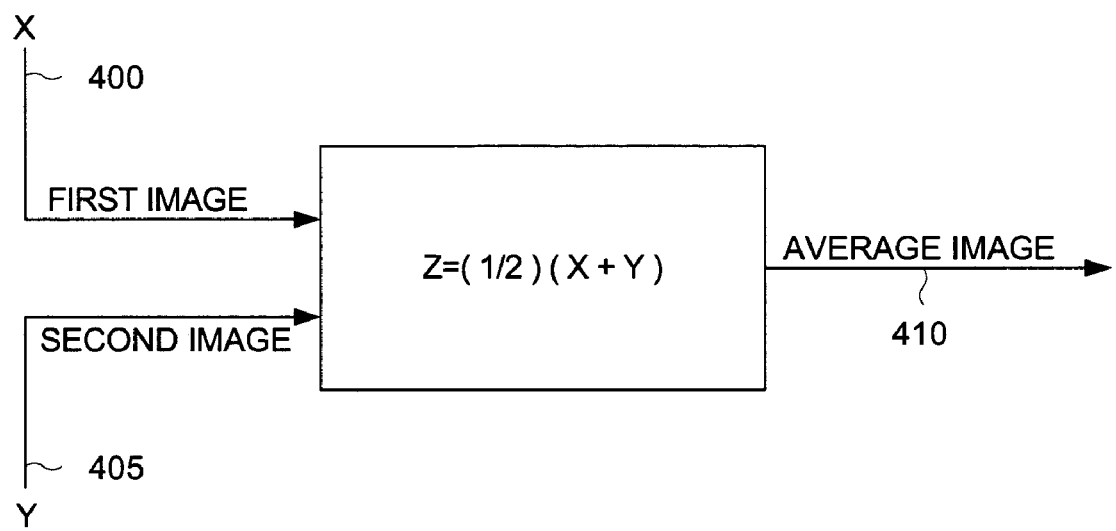
FIG. 11 is a block diagram of one embodiment of an averaging unit.

FIG. 11 is a block diagram of one embodiment of an averaging unit. This embodiment receives a first image 400 and a second image 405. The unit calculates the average of the two images to form a third image 410. According to one use case that may more precisely illustrate the operation of the averaging unit, first image 400 is described by intensity function $i_1(x, y)$. Second image 405 according to this use case is described by intensity function $i_2(x, y)$. The average of the first and second image can be described mathematically as $$i_{avg}(x, y) = \frac{1}{2}(i_1(x, y) + i_2(x, y)).$$

In words, at each point, (x, y), the intensity of the average image is one half of the sum of the intensities of the first and second images at the same point, (x, y). One alternative embodiment of the averaging unit combines the intensity functions of n images where n is an integer greater than 2. More precisely, the intensities at each point of each of the n images are summed together, and the result is divided by n to obtain an average intensity at each point.

Figure 12:
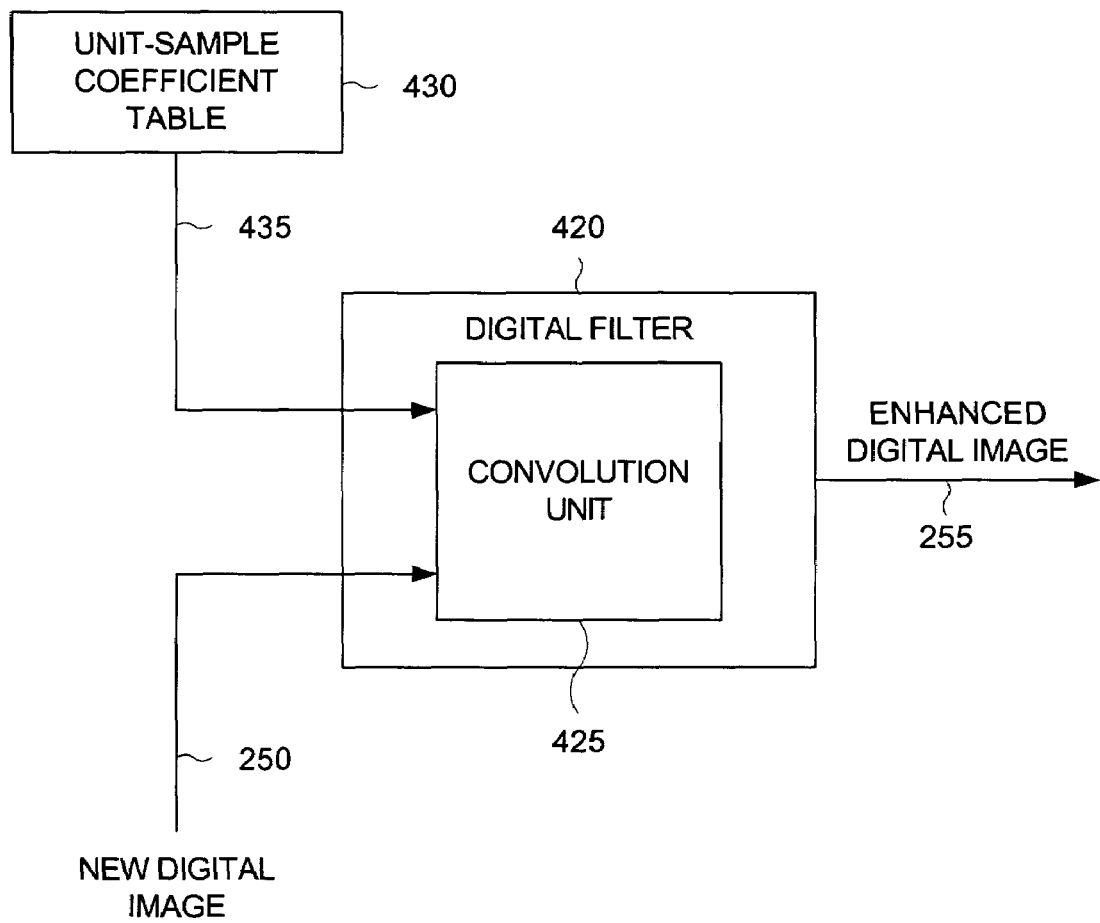
FIG. 12 is a block diagram of one embodiment of an enhancement application unit.

FIG. 12 is a block diagram of one embodiment of an enhancement application unit 210. This embodiment comprises a digital filter 420 that may receive a new digital image on input terminal 250. The digital filter 420 further is able to receive coefficients from a coefficient table 430 over path 435. The digital filter 420 further comprises a convolution unit 425 that is capable of computing a convolution of the new digital image on input 250 with the table of coefficients available on path 435. The result of the convolution comprises an enhanced digital image that is presented on path 255.

According to one alternative embodiment of the enhancement application unit 210, the unit-sample coefficient table 430 comprises a two-dimensional unit-sample coefficient table. This alternative embodiment further comprises a two-dimensional digital filter comprising a two-dimensional convolution unit. The two-dimensional convolution unit 425 in this alternative embodiment is capable of performing a two-dimensional convolution of a two-dimensional input 250 and a two-dimensional unit-sample response included in the unit-sample coefficient table 430.

According to another alternative embodiment of the digital filter 420 depicted in FIG. 12, the convolution unit 425 comprises a two-dimensional convolution unit. One embodiment of a two-dimensional convolution unit comprises the structure depicted in FIG. 10. According to one illustrative mode of operation that uses the structure of FIG. 10 to perform a two-dimensional convolution, the coordinator 260 accepts a new digital image on input path 231. The coordinator 260 passes the new digital image to the two-dimensional transform unit 265 on path 275. The two-dimensional transform unit 265 computes a two-dimensional transform of the new digital image. The result is passed to the coordinator 260 on path 280. The coordinator 260 temporarily stores the two-dimensional transform of the new digital image. The coordinator 260 further accepts a two-dimensional unit-sample response on input path 236. The coordinator passes the two-dimensional unit-sample response to the two-dimensional transform unit 265 on path 275. The two-dimensional transform unit 265 computes a two-dimensional transform of the two-dimensional unit-sample response. The result is passed to the coordinator 260 on path 280. The coordinator 260 passes the two-dimensional transform of the new digital image to the arithmetic unit 270 on path 285. The coordinator 260 also passes the two-dimensional transform of the two-dimensional unit-sample response to the arithmetic unit 270 on path 290. The coordinator 260 issues a multiply command 295 to the arithmetic unit 270. The multiply command 295 causes the arithmetic unit 270 to perform a two-dimensional complex multiplication of the transform of the reference digital image received on input 285 by the transform of the two-dimensional unit-sample response received on input 290 to form a two-dimensional product. The arithmetic unit 270 computes the product as commanded and places the product on path 305. The coordinator 260 issues a steering command 300 to the steering unit 275 that causes the product to appear on path 310. The product thus is received by the coordinator 260. The coordinator 260 passes the product to the two-dimensional transform unit 265 on path 275. The coordinator 260 sets the INV control 315 to TRUE to command the two-dimensional transform unit 265 to compute a two-dimensional inverse transform. The two-dimensional transform unit 265 computes the two-dimensional inverse transform as commanded and presents the result to the coordinator 260 on path 280. The result received by the coordinator 260 represents the digitally-filtered version (i.e. the enhanced or reconstructed version) of the new digital image. To communicate the result to the output of the unit, the coordinator passes the result to the arithmetic unit 270 on path 285. The coordinator 260 further passes a constant, one, to the arithmetic unit 270 on path 290. The coordinator 260 still further issues a multiply command 295 to the arithmetic unit 270. The arithmetic unit 270 multiplies the enhancement function by one and presents the enhancement function on path 305. The coordinator 260 issues a steering command 300 to the steering unit 275 that causes the reconstructed image to be presented on path 241. According to one exemplary embodiment of the present invention, path 241 connects to path 255. The reconstructed version of the new digital image is thus passed to the conveyance unit 215.

Figure 13:
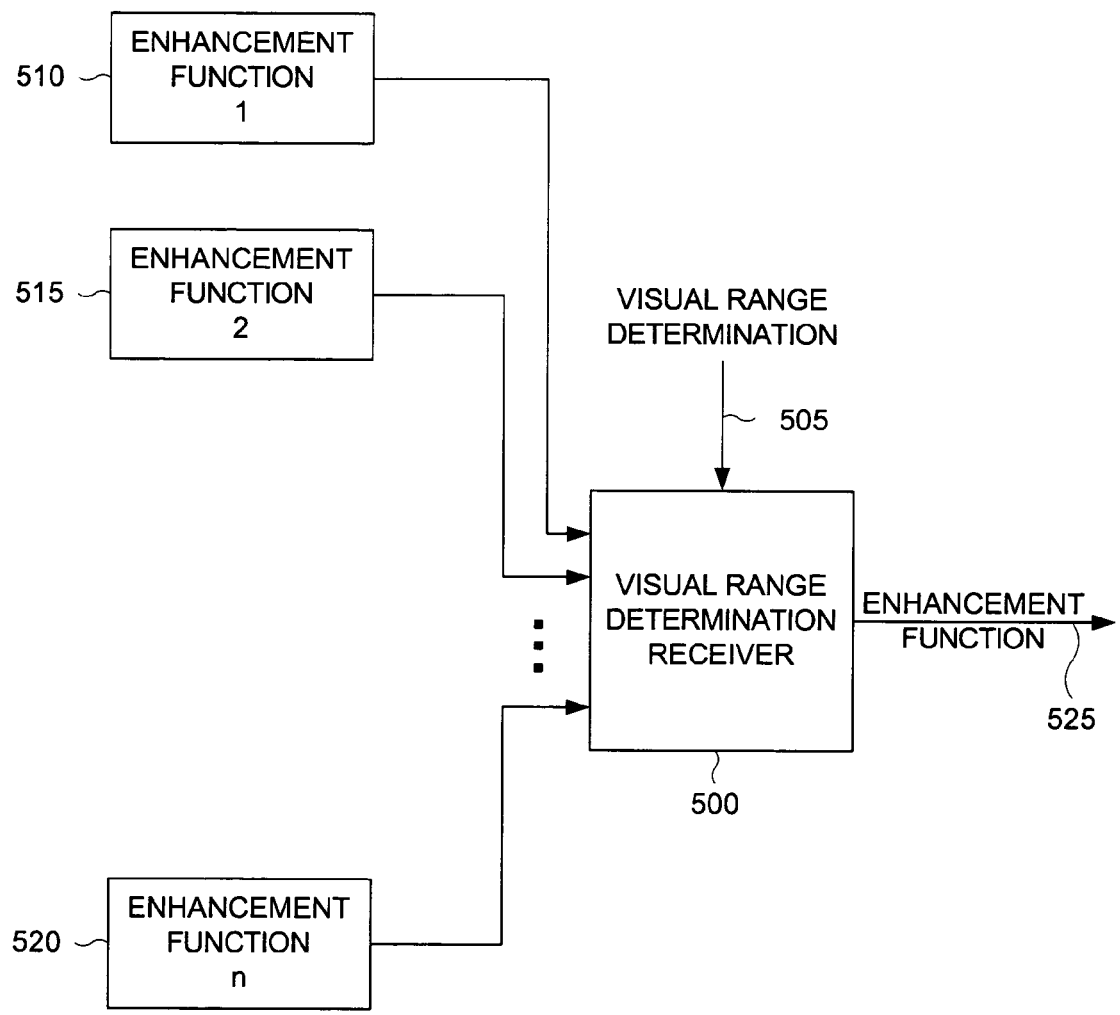
FIG. 13 is a block diagram of one alternative embodiment of an enhancement application unit.

FIG. 13 is a block diagram of one alternative embodiment of an enhancement application unit. This alternative embodiment incorporates an ability to select one of a plurality of enhancement functions according to a visual range determination. The embodiment comprises a visual range determination receiver 500 and a store of n enhancement functions (510, 515, 520). The value of n may be any value larger than one. According to one exemplary mode of operation, the visual range determination receiver 500 receives a visual range determination on input 505. The visual range determination receiver 500 also is able to access the plurality of enhancement functions (510, 515, 520). According to the value of the visual range, one of the enhancement functions (510, 515, 520) is selected and presented at the output 525 of the visual range determination receiver 500. According to one illustrative embodiment, the output 525 of the visual range determination receiver 500 connects to input 240 of the enhancement function application unit 210.

Figure 14:
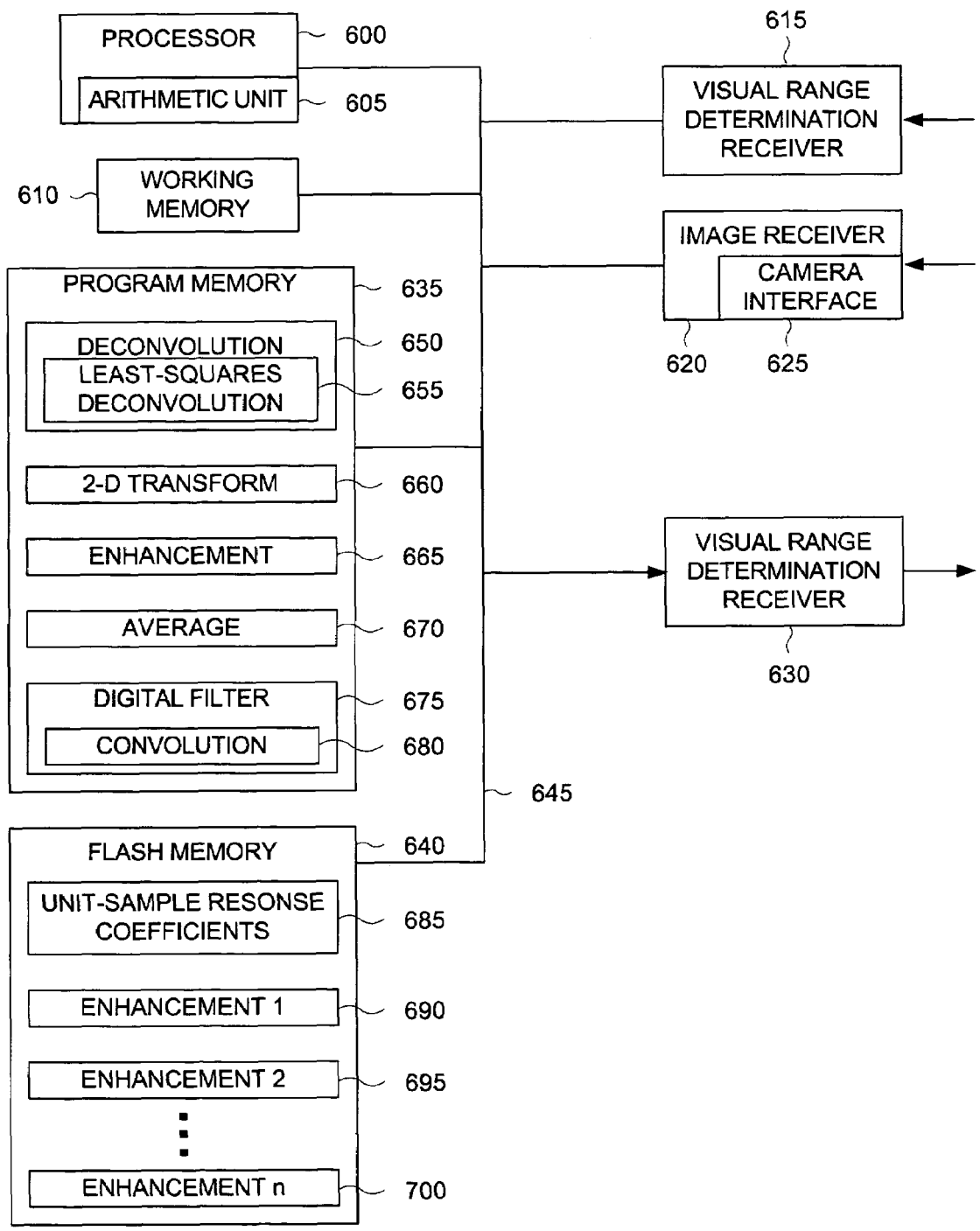
FIG. 14 is a block diagram of one embodiment of an image quality enhancement computer.

FIG. 14 is a block diagram of one embodiment of an image quality enhancement computer. This embodiment comprises a processor 600, working memory 610, and an image receiver 620. The processor in this embodiment comprises an arithmetic unit 605. This embodiment further comprises a conveyance interface 630, program memory 635, flash memory 640 and a system bus 645 that communicatively interconnects the aforementioned elements. According to one exemplary embodiment, the image receiver comprises a digital camera interface 625. In the embodiments considered below, images received by the image receiver 620 may employ the camera interface 625 to receive the images from a digital camera. According to one alternative embodiment, the image quality enhancement computer further comprises a visual range determination receiver 615, the function of which is described infra.

It should be noted that, generally, program memory 635 and flash memory 640 comprise two different types of nonvolatile memory. In the present embodiment, program memory 635 is programmed once, and the content of program memory cannot thereafter be changed. The flash memory 640 in one illustrative embodiment may be erased and reprogrammed electrically. The contents of neither program memory 635 nor flash memory 640 are lost when power to the computer is removed.

The program memory 635, according to one exemplary embodiment of the image quality computer, comprises instruction sequences for deconvolution 650, two-dimensional transform computation 660, enhancement function application 665, digital image averaging 670, and digital filtering 675. The working memory 610 is capable of storing instructions and further is capable of storing digital images, transforms of digital images, and other parameters as needed. The processor 600 is capable of loading instruction sequences into working memory 610 and of executing the instruction sequences.

The image receiver 620 of the image quality enhancement computer, according to one illustrative mode of operation, receives a reference digital image. The image receiver 620 passes the reference digital image to the processor 600 by way of the system bus 645. The processor stores the reference digital image as an array in working memory 610. The image receiver 620 further receives a degraded version of the reference digital image. The degraded version of the reference digital image is likewise passed to the processor 600. The processor 600 stores the degraded version of the reference digital image as an array in working memory 610.

Pursuant to computing an enhancement function, the processor 600 loads the deconvolution instruction sequence 650 into working memory 610. The deconvolution instruction sequence 650, when executed by the processor 600, minimally causes the processor 600 to load the two-dimensional transform instruction sequence 660 into working memory 610. The two-dimensional transform instruction sequence 660, when executed by the processor 600, minimally causes the processor to compute a two-dimensional transform of an array in working memory 610 according to information received from the processor 600. According to one illustrative embodiment, the information received from the processor comprises a location in memory of an array and the size of the array. According to another illustrative embodiment, the information further comprises a flag, INV, placed in working memory 610 by the processor 600. When INV is FALSE, executing the two-dimensional transform instruction sequence 660 causes the processor 600 to calculate a two-dimensional transform of the array. When INV is TRUE, executing the two-dimensional transform instruction sequence causes the processor 600 to calculate a two-dimensional inverse transform of the array.

Continuing to execute the deconvolution instruction sequence 650, the processor 600 places information in working memory 610 according to the reference digital image. The processor 600 executes the two-dimensional transform instruction sequence 660 to compute a two-dimensional transform of the reference digital image in working memory 610. The result of the two-dimensional transform computation is stored in a first array in working memory 610. Similarly, the processor 600 further executes the two-dimensional transform instruction sequence 660 to compute a two-dimensional transform of the degraded version of the reference digital image in working memory 610. The result of the two-dimensional transform computation is stored in a second array in working memory 610. The processor 600 then passes the first and second arrays to the arithmetic unit 605. The processor 600 commands the arithmetic unit 605 to perform a point-by-point division of the first array (i.e. the two-dimensional transform of the reference digital image) by the second array (i.e. the two-dimensional transform of the degraded version of the reference digital image) to form a quotient array. The arithmetic unit 605 performs the commanded division operation. The processor 600 receives the quotient array and stores the quotient array in working memory 610. According to one use case, the quotient array represents the transform, EF(u, v), of an enhancement function according to (5) supra.

Still according to the deconvolution instruction sequence 650, the processor 600 places information in working memory 610 according to the quotient array. The processor 600 also sets the value of the INV the flag in working memory 610 to TRUE. The processor 600 executes the two-dimensional transform instruction sequence 660 to compute a two-dimensional inverse transform of the quotient array in working memory 610. According to one use case, the computed inverse transform represents an enhancement function, ef(x, y), according to (6) supra.

According to one alternative embodiment of the image quality enhancement computer, the processor 600 computes a least-squares form of an enhancement function. According to one illustrative mode of operation of this alternative embodiment, the processor 600 receives a reference digital image and a degraded version of the reference digital image as described supra. The processor 600 loads the least-squares deconvolution sequence 655 into working memory 610. The least-squares deconvolution sequence 655, when executed by the processor 600 minimally causes the processor to compute a two-dimensional transform, EF(u, v), of an enhancement function according to (8) as described supra and to place the result in an array in working memory 610.

Continuing to execute the least-squares deconvolution instruction sequence 655, the processor 600 places information in working memory 610 according to the two-dimensional transform, EF(u, v). The processor 600 also sets the value of the INV the flag in working memory 610 to TRUE. The processor 600 executes the two-dimensional transform instruction sequence 660 to compute a two-dimensional inverse transform of the two-dimensional transform, EF(u, v), in working memory 610. According to one use case, the computed inverse transform comprises ef(x, y), a least-squares estimate of an enhancement function.

According to one embodiment of the image quality enhancement computer, an enhancement function comprises an array in working memory. The array also may be considered to comprise a table of unit-sample response coefficients for a two-dimensional digital filter used to apply the enhancement function to a new digital image.

According to one embodiment of the image quality enhancement computer, the flash memory 640 may be used to store one or more enhancement functions as computed supra. According to another embodiment, an enhancement function, when stored in flash memory 640, may be referred to as a table of unit-sample response coefficients 685.

The image quality enhancement computer further is capable of enhancing a new digital image. According to one illustrative mode of operation, a new digital image is received by the image receiver 620. The processor stores the new digital image in working memory 610. To apply an enhancement function to the new digital image, the processor 600 loads the enhancement instruction sequence 665 into working memory 610 and executes the enhancement instruction sequence 665. The enhancement instruction sequence 665, when executed by the processor 600, minimally causes the processor 610 to load the digital filter instruction sequence 675 into working memory 610 and to execute the digital filter instruction sequence 675. The digital filter instruction sequence 675, when executed by the processor 600 minimally causes the processor 600 to load a table of unit-sample response coefficients 685 from flash memory 640 and to store the table of unit-sample response coefficients 685 in working memory 610. Continuing to execute according to the digital filter instruction sequence 675, the processor loads the convolution instruction sequence 680 into working memory 610 and executes the convolution instruction sequence 680. Executing the convolution instruction sequence 680 minimally causes the processor 600 to compute a convolution of the unit-sample response coefficients 685 and the new digital image. According to one exemplary embodiment, the unit-sample response is one-dimensional, and the convolution of the unit-sample response coefficients 685 with the new digital image is executed on a line-by-line basis in the manner of (10) supra. According to another exemplary embodiment, the unit-sample response is two-dimensional, and the convolution of the unit-sample response with the new digital image is two-dimensional in the manner of (11) supra. According to either embodiment, the result of the convolution is a reconstructed (i.e. enhanced) version of the new digital image. The reconstructed version of the new digital image may be passed to the conveyance interface 630 that is capable of making the reconstructed version of the new digital image available for further interpretation. According to one illustrative embodiment, conveyance interface 630 passes the reconstructed version of the new digital image to a digital display device.

The image quality enhancement computer further is capable of computing an average of two digital images. To achieve the averaging according to one exemplary mode of operation, the processor 600 receives a first digital image from the image receiver 620. The processor stores the first digital image in a first array in working memory 610. The processor 600 further receives a second digital image. The processor 600 further stores the second digital image in a second array in working memory 610. According to one use case, the first digital image is one version of a degraded version of a reference digital image. According to the same use case, the second digital image is a second version of a degraded version of the same reference digital image.

The processor 600 computes an average of the two digital images by loading the average instruction sequence 670 into working memory and executing the average instruction sequence 670. Executing the average instruction sequence 670 minimally causes the processor to sum each element of the first array with the corresponding element of the second array and to divide the sum by two. The result is a new array that may be stored in working memory 610.

According to one alternative embodiment of the enhancement instruction sequence 665, two-dimensional transform computations are used to perform the enhancement operation. According to one illustrative embodiment, an enhancement function is stored in nonvolatile memory as a two-dimensional transform. In one specific use case, the enhancement function is identified as ENHANCEMENT 1 690 and is stored as a two-dimensional transform in flash memory 640.

According to one illustrative mode of operation, a new digital image is received by the image receiver 620. The image receiver 620 passes the new digital image to the processor 600. The processor 600 stores the new digital image in working memory 610. The processor loads the enhancement instruction sequence 665 into working memory and executes the enhancement instruction sequence 665. Executing the enhancement instruction sequence 665, according to one example, minimally causes the processor to place into memory information according to the new digital image and to load the two-dimensional transform instruction sequence 660 into working memory 610. The processor 600 also sets the value of the INV the flag in working memory 610 to FALSE. The processor 600 executes the two-dimensional transform instruction sequence 660 to compute a two-dimensional transform of the reference digital image in working memory 610. The result of the two-dimensional transform computation is stored in a first array in working memory 610.

Continuing to execute the enhancement instruction sequence 665, the processor passes the ENHANCEMENT 1 690 two-dimensional transform to the arithmetic unit 605. The processor 600 further passes the two-dimensional transform of the new digital image to the arithmetic unit 605. The processor commands the arithmetic unit 605 to perform a point-by-point multiplication of the ENHANCEMENT 1 two-dimensional transform and the two-dimensional transform of the new digital image and to store the product as an array in working memory 610. The processor 600 then places in working memory 610 information according to the product array. The processor 600 also sets the value of the INV the flag in working memory 610 to TRUE. The processor 600 executes the two-dimensional transform instruction sequence 660 to compute a two-dimensional inverse transform of product array in working memory 610. According to one use case, the computed inverse transform represents a reconstructed (i.e. enhanced) version of the new digital image according to (14) supra.

According to one alternative embodiment of the image quality enhancement computer, the flash memory 640 has stored therein a plurality of enhancement functions. According to one illustrative example, the enhancement functions are indexed according to a level of haze present when the enhancement functions were derived. One measure of the level of haze is a visual range determination. Conceptually, in order best to enhance a new digital image, an enhancement function should be employed that was derived under conditions similar to those that apply to the new digital image. Stated another way, if a new digital image is obtained in conditions where a visual range determination of, e.g., 2 applies, then the new digital image would be best enhanced by an enhancement function derived when the visual range determination also was 2.

The embodiment of FIG. 14 illustrates one alternative embodiment of an image quality enhancement computer that enhances a new digital image according to a visual range determination. According to one illustrative mode of operation, a new digital image is received in the image receiver 620 as described supra. The image is received by the processor 600 that computes a two-dimensional transform of the new digital image as likewise described supra. A visual range determination also is received by the visual range determination receiver 615. The visual range determination is an integer ranging from 1 to n in this alternative embodiment where n is an integer greater than 1. The visual range determination is received by the processor 600 and stored in working memory 610. The processor 600 loads the enhancement instruction sequence 665 into working memory and executes the enhancement instruction sequence 665. Executing the enhancement instruction sequence 665, according to this alternative embodiment, minimally causes the processor 600 to note the value of the visual range determination stored in working memory 610 and to load a transform of an enhancement function (690, 695, 700) having an index equal to the visual range determination. A reconstructed (i.e. enhanced) version of the new digital image then is computed according to the method described supra.

ALTERNATIVE EMBODIMENTS

While this invention has been described in terms of several alternative methods and exemplary embodiments, it is contemplated that alternatives, modifications, permutations, and equivalents thereof will become apparent to those skilled in the art upon a reading of the specification and study of the drawings. It is therefore intended that the true spirit and scope of the present invention include all such alternatives, modifications, permutations, and equivalents.

What is claimed is:

1. A method of enhancing the quality of a new digital image comprising:
   receiving reference digital images;
   receiving a first degraded version of the reference digital image;
   receiving a second degraded version of the reference digital image;
   deconvolving the reference digital image with the first degraded version of the reference digital image to form a first enhancement function;
   deconvolving the reference digital image with the second degraded version of the reference digital image to form a second enhancement function;
   indexing the first enhancement function according to the degree of degradation of the first degraded version of the reference digital image;
   indexing the second enhancement function according to the degree of degradation of the second degraded version of the reference digital image;
   storing the first and second enhancement functions to a storage device;
   receiving a new digital image;
   determining a degree of degradation of the new digital image;
   selecting one of the stored first and second enhancement functions having an index corresponding to the degree of degradation of the new digital image;
   applying the selected enhancement function to the new digital image to form an enhanced digital image; and
   making available the enhanced digital image.

2. The method of claim 1 wherein deconvolving the reference digital image with the degraded version of the reference digital image comprises:
   computing a two-dimensional transform of the reference digital image;
   computing a two-dimensional transform of the degraded version of the reference digital image;
   dividing the two-dimensional transform of the reference digital image by the two-dimensional transform of the degraded version of the reference digital image to form a two-dimensional quotient; and
   computing a two-dimensional inverse transform of the two-dimensional quotient.

3. The method of claim 1 wherein deconvolving the reference digital image with the degraded version of the reference digital image comprises computing a least-squares deconvolution of the reference digital image with the degraded version of the reference digital image.

4. The method of claim 1 wherein receiving a degraded version of the reference digital image comprises:
   receiving a first degraded version of the reference digital image;
   receiving a second degraded version of the reference digital image; and
   combining the first and second degraded versions of the reference digital image to form an average degraded version of the reference digital image.

5. The method of claim 1 wherein receiving the new digital image comprises transferring the new digital image from a digital camera.

6. The method of claim 1 wherein applying an enhancement function comprises:
   representing the enhancement function as a digital filter;
   applying the new digital image to the input of the digital filter; and
   computing the output of the digital filter.

7. An apparatus for enhancing the quality of a new digital image comprising:
   image receiving unit that receives digital images;
   supervisor capable of causing the image receiving unit to receive a reference digital image, a first degraded version of the reference digital image, a second degraded version of the reference image, and a new digital image;
   deconvolution unit that deconvolves the reference digital image with the first degraded version of the reference digital image to form a first enhancement function and deconvolves the second degraded version of the reference digital image with the reference digital image to form a second enhancement function;
   storage unit that stores the first enhancement function indexed according to the degree of degradation in the first degraded version of the reference digital image and stores the second enhancement function indexed according to the degree of degradation of the second enhancement function;
   enhancement application unit that applies one of the stored first and second enhancement functions to the new digital image to form an enhanced digital image based on a degree of degradation of the new digital image; and
   conveyance unit that makes available the enhanced digital image.

8. The apparatus of claim 7 herein the deconvolution unit comprises:
   two-dimensional transform computing unit capable of computing a two-dimensional transform; and
   two-dimensional complex arithmetic unit capable of dividing a first two-dimensional transform by a second two-dimensional transform.

9. The apparatus of claim 7 herein the deconvolution unit comprises a least-squares deconvolution unit capable of computing a least-squares deconvolution to form a reference digital image with a degraded version of the reference digital image to form an enhancement function.

10. The apparatus of claim 7 further comprising an averaging unit capable of combining a first degraded version of a reference digital image with a second degraded version of the reference digital image to form an average degraded version of the reference digital image.

11. The apparatus of claim 7 wherein the image receiving unit comprises an interface to a digital camera.

12. The apparatus of claim 7 wherein the enhancement application unit comprises:
- digital filter unit-sample response coefficient table that represents the enhancement function;
- digital filter capable of accepting the new digital image as input, wherein the digital filter further is capable of producing an output digital image by digitally filtering the input according to the digital filter unit-sample response coefficient table.

13. An image quality enhancement computer comprising:
- memory capable of storing instructions;
- processor capable of executing instruction sequences;
- image receiver capable of receiving digital images and of passing the digital images to the processor;
- image processing instruction sequences stored in the memory, said image processing instruction sequences comprising:
  - deconvolution instruction sequence that, when executed by the processor, minimally causes the processor to:
    - accept a first digital image from the image receiver;
    - accept a first degraded version of the first image from the image receiver;
    - accept a second degraded version of the first image from the image receiver,
    - form a first enhancement function by deconvolving the first digital image with the first degraded version of the first digital image,
    - form a second enhancement function by deconvolving the first digital image with the second degraded version of the first digital image,
  - indexing instruction sequence that, when executed by the processor, minimally causes the processor to:
    - store a plurality of enhancement functions to a storage device;
    - index the first enhancement function according to the degree of degradation of the first degraded version of the first image; and
    - index the second enhancement function according to the degree of degradation of the second degraded version of the first image; and
  - enhancement instruction sequence that, when executed by the processor, minimally causes the processor to:
    - receive an un-enhanced digital image from the image receiver;
    - select one of the stored first and second enhancement functions having an index corresponding to a degree of degradation matching that of the un-enhanced digital image; and
    - form an enhanced digital image by applying the selected enhancement function to an un-enhanced digital image; and
- conveyance interface capable of providing the enhanced digital image.

14. The image quality enhancement computer of claim 13 wherein the memory further has stored therein a two-dimensional transform instruction sequence that, when executed by the processor, minimally causes the processor to perform a two-dimensional transform and wherein the processor comprises an arithmetic unit capable of dividing a first two-dimensional transform by a second two-dimensional transform.

15. The image quality enhancement computer of claim 13 wherein the deconvolution instruction sequence comprises a least-squares deconvolution instruction sequence that, when executed by the processor, minimally causes the processor to perform a least-squares deconvolution of a first digital image with a second digital image.

16. The image quality enhancement computer of claim 13 wherein the memory further has stored therein an average instruction sequence that, when executed by the processor, minimally causes the processor to compute an average of two digital images.

17. The image quality enhancement computer of claim 13 wherein the image receiver comprises a digital camera interface capable of receiving a digital image transferred from a digital camera.

18. The image quality enhancement computer of claim 13 wherein the memory has stored therein:
- digital filter unit-sample response coefficient table that represents the enhancement function; and
- digital filter instruction sequence that, when executed by the processor, minimally causes the processor to accept a digital image as input and to produce an output digital image by digitally filtering the input according to the digital filter unit-sample response coefficient table.

19. The image quality enhancement computer of claim 13 wherein the image processing instruction sequences further comprise:
- two-dimensional transform instruction sequence that, when executed by the processor, minimally causes the processor to perform a two-dimensional transform and wherein the processor comprises an arithmetic unit capable of computing the product of a first two-dimensional transform and a second two-dimensional transform.

20. The method of claim 1, wherein the degree of degradation is a measure of visual range.

21. The method of claim 7, wherein the degree of degradation is a measure of visual range.

22. The method of claim 13, wherein the degree of degradation is a measure of visual range.

* * * * *